Oct. 18, 1938.   R. AVIGDOR   2,133,841
LOCKING DEVICE FOR PREVENTING ACCIDENTAL LOOSENING
OF SEPARABLE SCREWED PIPE JOINTS
Filed March 24, 1937

Inventor:
Rifat Avigdor,
Frank S. Appleman
attorney.

Patented Oct. 18, 1938

2,133,841

UNITED STATES PATENT OFFICE 2,133,841

LOCKING DEVICE FOR PREVENTING ACCIDENTAL LOOSENING OF SEPARABLE SCREWED PIPE JOINTS

Rifat Avigdor, Berlin, Germany

Application March 24, 1937, Serial No. 132,821
In Germany July 27, 1935

4 Claims. (Cl. 151—3)

This invention relates to a safety or locking device for preventing accidental loosening of separable, fluid tight screwed pipe joints employing nipples and cap nuts.

In known locking devices for fluid tight screwed pipe joints of this kind, it was necessary to provide bores or milled portions or other means on the interscrewed portions which were to be locked together. These operations were tedious, took up too much time and were expensive, because generally they could not be carried out on the site where the joint was installed. The finished locking device had to be destroyed if the connection was subsequently taken apart, and could not be used again. In such cases, the application of locking devices was often omitted altogether.

The locking device according to the invention is very simple to produce and easy to apply; moreover, it can be used repeatedly in the case of resetting or deliberate separation of the screwed joint.

According to the invention, the locking device comprises a leaf spring bent substantially into U-shape, the shorter limb of which surrounds the nipple in the manner of a clamp and is provided with securing means, e. g. barbs disposed at a suitable diametrical distance apart on its clamp portion and engaging in an undercut groove of the nipple thread. The other limb, formed with an aperture and thrust over the nipple, is provided on part of the edge of the opening with notches or like securing means for the cap nut, the portion of the edge of the opening not provided with notches substantially corresponding to the neck of the nut for supporting the locking device.

The limb of the spring provided with notches is preferably cranked and the notches are disposed in large numbers as close together as possible, so that a certain fine tightening of the nut becomes possible.

An aperture at the bend of the spring, which is made narrow to begin with, serves to afford greater resiliency particularly in the case of large sized devices.

In another embodiment of the invention, the short limb of the U-shaped spring is prolonged and is also provided with an opening instead of a clamp, said opening enabling the locking device to be threaded over the nipple. Outside on the edge of this opening are provided claws, which engage the flanks of a polygonal portion provided on the nipple.

Embodiments of the invention are shown, by way of example, in the accompanying drawing.

Figure 1:
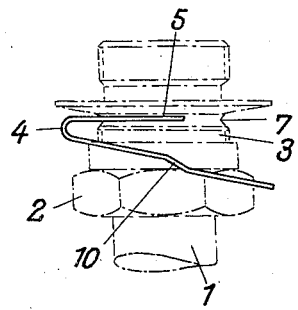
Fig. 1 is a side elevation of the locking device as applied to a joint, wherein a pipe is interscrewed in fluid tight manner with a wall screw union.
Figure 2:
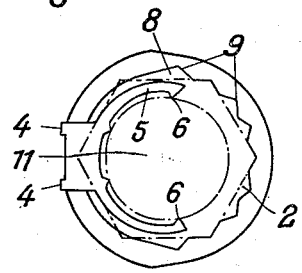
Fig. 2 is a plan view thereof.

In Figs. 1 and 2, the cap nut 2 is seated on the tube 1. When the nut 2 is screwed on to the wall screw union (nipple) 3, it presses the end of the tube to the mouth of the nipple, the tube end and the nipple mouth not being visible in the drawing. 4 is the leaf spring bent substantially in U-shape, the short limb of which terminates in the clamp 5 having barbs 6. These engage resiliently in the undercut thread portion 7 of the nipple. The other outwardly springy long limb of the spring 4 has an opening 8 provided with notches 9 and is usually bent as at 10. 11 is the aperture provided in the bend of the spring 4.

In Fig. 3 again a cap nut 2 is seated on the tube 1, the nut pressing the tube end (not shown) to the mouth (not shown) of the nipple 3, which in this case is provided with a hexagonal portion 12. 4 is the leaf spring, the only slightly shorter limb of which has an opening and embraces therewith the thread of the nipple, while the claws 13 of said limb engage the flanks of the hexagonal portion. The spring limb embracing the cap nut is formed in the same manner as in the previous embodiment.

The locking device is mounted in the following manner:—

Prior to the screwing on of the nut 2, the clamp 5 is pushed over the undercut portion 7 of the thread, which causes the barbs 6 to be pressed into the thread. The longer limb is then bent towards the shorter and the nut 2 is tightened. The longer limb is now released, so that it embraces the nut 2. By lifting the longer limb off of the nut, the locking device may be rendered inoperative without the destruction of any part of the locking spring, which is preferably provided with a surface protective coating. Nor is there any destruction of the parts of the screwed joint, all parts being capable of repeated use.

Figure 3:
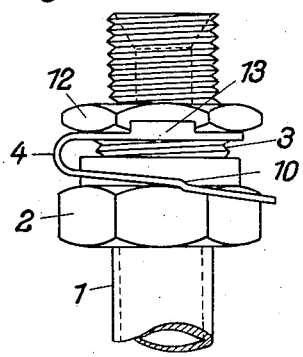
Fig. 3 is a side elevation of the modified locking device as applied to a pipe joint including a hexagonal nipple.

In the embodiment of Fig. 3, the shorter limb is first threaded onto the nipple by means of the opening provided at the end of said limb, whereupon the procedure is the same as before, after the claws 13 are engaged with the member 12.

The securing means may be alike on both limbs, and may differ in construction from the examples shown, provided they enable the locking device to be rendered inoperative by bending the limbs away from the members to be locked, and to re-establish the operative condition owing to the resiliency of the spring when the same is allowed to spring back.

What I claim is:—

1. In a locking device for preventing accidental loosening of separable fluid-tight screwed pipe joints employing nipples and cap nuts, comprising a leaf spring bent substantially into U-shape and having outwardly springy limbs, one of said limbs being short and provided with a clamp, barbs formed on said clamp, the other of said limbs having an opening provided partly with notches, the part of said opening not provided with notches conforming to the cross section of the circular portion of the nut for supporting said locking device.

2. In a locking device for preventing accidental loosening of separable fluid-tight screwed pipe joints employing nipples and cap nuts, comprising a leaf spring bent substantially into U-shape and having outwardly springy limbs, one of said limbs being short, said short limb being provided with a clamp having barbs, the other of said limbs being provided with a notched opening, said last mentioned limb having an offset connected portion, one engaging the circular part of said nut and the other the polygonal part thereof.

3. In a locking device for preventing accidental loosening of pipe connections comprising a nipple provided with an external screw thread and a nut adapted to be screwed thereon, said locking device consisting of a blade spring bent substantially into U-shape and having outwardly springy limbs projecting slightly beyond the nipple and the nut, the limb thereof which cooperates with the nipple having an opening through which can be guided the threaded stem of the nipple and carrying claws which embrace the polygonal surface of the nipple, the other limb acting on the polygonal surface of the nut being provided with an opening having notches on one part of the rim, and having an offset connected portion which is so positioned that the free end of the limb grips the polygonal surface of the nut by means of the notches, the other end of said limb engaging the rounded neck of the nut, the opening at this part of the limb being of substantially the same diameter as the said neck for the purpose of supporting the locking device.

4. In a locking device for preventing accidental loosening of separable connections comprising a nipple and a nut adapted to be screwed thereon, said locking device consisting of a blade spring bent substantially into U-shape and having outwardly springy limbs projecting beyond said nipple and nut, said blade spring having a recess at the bent portion, one of said limbs, which cooperates with the nipple, having an opening carrying claws which embrace the nipple, said other limb, which acts on the nut being formed with an opening therein having notches on one part of the rim thereof and being provided with an offset connected portion, said offset portion being so positioned that the free end of the limb grips the polygonal surface of the nut by means of the notches, the end of said last limb facing the part bent into U-shape engaging the rounded neck of the nut by means of that portion of the opening which is free from notches, this portion of the opening corresponding in diameter substantially to the diameter of the said neck for the purpose of supporting said locking device.

RIFAT AVIGDOR.